US009213979B2

(12) United States Patent
Sun et al.

(10) Patent No.: US 9,213,979 B2
(45) Date of Patent: Dec. 15, 2015

(54) ARRAY ATTRIBUTE CONFIGURATOR

(75) Inventors: Hongyu Sun, San Mateo, CA (US);
Ronald Yang, Bel Air, MD (US)

(73) Assignee: Oracle International Corporation,
Redwood Shores, CA (US)

( * ) Notice: Subject to any disclaimer, the term of this patent is extended or adjusted under 35 U.S.C. 154(b) by 1097 days.

(21) Appl. No.: 12/336,847

(22) Filed: Dec. 17, 2008

(65) Prior Publication Data

US 2010/0153467 A1    Jun. 17, 2010

(51) Int. Cl.
*G06F 17/30* (2006.01)
*G06Q 30/02* (2012.01)
*G06F 17/24* (2006.01)

(52) U.S. Cl.
CPC .............. *G06Q 30/02* (2013.01); *G06F 17/246* (2013.01)

(58) Field of Classification Search
USPC ......................................................... 707/802
See application file for complete search history.

(56) References Cited

U.S. PATENT DOCUMENTS

| | | | | |
|---|---|---|---|---|
| 7,340,060 | B2 * | 3/2008 | Tomkins et al. | 380/277 |
| 7,856,430 | B1 * | 12/2010 | Pollastro | 707/709 |
| 2003/0204275 | A1 * | 10/2003 | Krubeck | 700/91 |
| 2004/0172584 | A1 * | 9/2004 | Jones et al. | 715/500 |
| 2005/0177573 | A1 * | 8/2005 | Gauthier et al. | 707/10 |
| 2005/0223032 | A1 * | 10/2005 | Shan et al. | 707/104.1 |
| 2006/0252476 | A1 * | 11/2006 | Bahou | 463/4 |
| 2007/0078889 | A1 * | 4/2007 | Hoskinson | 707/102 |
| 2007/0112704 | A1 * | 5/2007 | Tomkins et al. | 706/21 |
| 2007/0191110 | A1 * | 8/2007 | Crouse | 463/43 |
| 2010/0134614 | A1 * | 6/2010 | Aman | 348/135 |

OTHER PUBLICATIONS

Book entitled "Microsoft Office Excel 2007 for Windows", by Langer, Copyright 2007.*
Berger, Charlie, "Oracle Data Mining 11g, Know More, Do More, Spend Less," An Oracle White Paper, Jul. 2007, pp. 1-26, Oracle Corporation, Redwood Shores, CA, U.S.A.

* cited by examiner

*Primary Examiner* — Mahesh Dwivedi

(74) *Attorney, Agent, or Firm* — Miles & Stockbridge P.C.

(57) ABSTRACT

An array attribute configurator configures a set of received values based upon a predetermined set of unique value fields of an array. Array attribute configurator determines if duplicates exist within the set of received values. Array attribute configurator determines if a unique value field lacks a corresponding value within the set of received values. Array attribute configurator configures an array attribute from the set of received values based upon these determinations.

18 Claims, 6 Drawing Sheets

Array Attribute Configurator 16

Set of Unique Value Fields: $\{ F_1 \ ... \ F_n \}$

Array Attribute: $\{ F_1( x_1; \text{total } x_1) \ ... \ F_n(x_n; \text{total } x_n) \}$ $F_i$ represents a unique value field
$x_i$ represents a value corresponding to $F_i$
total $x_i$ represents the total number of values of $x_i$
n represents an integer value greater than 1

Fig. 2

ARRAY ATTRIBUTE CONFIGURATOR

FIELD OF THE INVENTION

One embodiment is directed generally to a computer prediction system, and in particular to configuring an array attribute.

BACKGROUND INFORMATION

Predictive analytics technology in dynamic business systems ("prediction systems") typically provide real-time intelligence by enabling real-time decisions and recommendations to be rendered. The real-time intelligence may be instilled into any type of business process or customer interaction. These systems typically rely on business rules, data mining, statistical methods, or a combination thereof.

For example, online shopping mechanisms may rely upon prediction systems to determine the likelihood that a particular customer may purchase a particular product. By using a prediction system, online shopping mechanisms may be able to provide marketing campaigns that are targeted to particular shoppers, e.g. those shoppers that will most likely buy their products. These online shopping mechanisms and marketing tactics, generally, help to increase sales.

However, in some instances, as in the above-mentioned online shopping example, these systems may employ algorithms that involve determining a correlation between input data (e.g., products that have been purchased) and target output data (e.g., target product) to arrive at a prediction. These systems may include a prediction or recommendation engine to perform, for example, collaborative filtering and/or singular vector decomposition. Depending upon a number of factors, such as the algorithm, the handling of the data, and the manner in which the data is represented or stored, these systems may generate inaccurate or unreliable information.

SUMMARY

One embodiment is an array attribute configurator that configures a set of received values based upon a predetermined set of unique value fields of an array. Array attribute configurator determines if duplicates exist within the set of received values. Array attribute configurator determines if there is a unique value field that lacks a corresponding value within the set of received values. Array attribute configurator configures an array attribute from the set of received values based upon these determinations.

BRIEF DESCRIPTION OF THE DRAWINGS

FIG. 2 is a block diagram illustrating an array attribute configurator and a representation of an array attribute in accordance with one embodiment.

DETAILED DESCRIPTION

One embodiment is a system that configures a reliable array attribute from a number of received values. The received values may be associated with a single attribute. The system includes an array attribute configurator that is able to identify and account for duplicate values and values not received (i.e., null values). The system ensures that the received values are configured in an appropriate manner before allowing the system to provide real-time intelligence, predictions, and/or business decisions.

Figure 1:
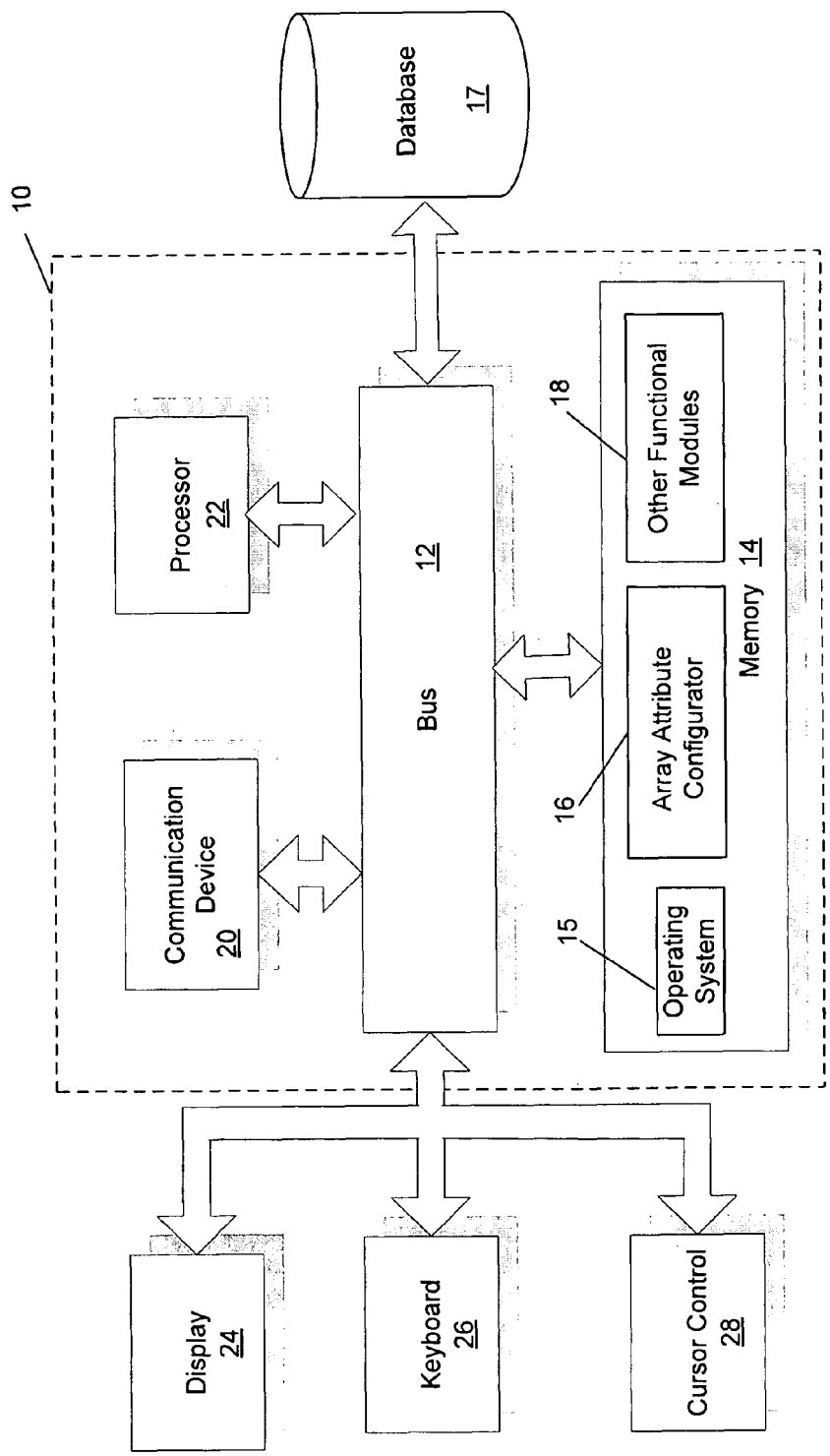
FIG. 1 is a block diagram of a system that is configured to implement one embodiment of the present invention.

FIG. 1 is a block diagram of a system 10 that can implement an embodiment. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. Modules include an operating system 15 that provides operating system functionality for system 10. Modules further include an array attribute configurator 16 that establishes an array attribute from a set of received values based on a number of determinations, as disclosed in more detail below. Modules may include a functional module 18, such as a prediction system that performs predictive analytics. Prediction system creates actionable intelligence from data flowing through the process in real-time. In other embodiments, array attribute configurator 16 may be a stand-alone system, or may be part of any other system.

Database 17 can be any type of database, such as a relational or flat file database. A database, in general, is a collection of tables, each of which storing information on related fields or columns, each of which represents a particular attribute. A table could have one or more rows with each row containing values for the columns/attributes of the table.

An attribute may correspond to a single value or an array of values. The term, "array attribute," refers to an attribute that can assume more than one value at the same time. A particular value, associated with an attribute, may be categorized as an exclusive value or a non-exclusive value.

If an attribute may assume only one value, then the attribute assumes an exclusive value. As an example, a customer data record may include an attribute, indicating a net income level of that particular customer for a particular year. The net income level for a particular customer for a particular year may assume only one value. In the context of that particular customer's data record, the attribute, indicating the net income level, will be associated with an exclusive value.

If an attribute may assume more than one value, then the values associated with the attribute are non-exclusive values. As an example, the attribute, "properties," within a customer data record may assume more than one value. In this case, the properties include three cars, a boat, and two houses. In the context of this particular customer's data record, the attribute, "properties," assumes non-exclusive values. Generally, a non-exclusive value of an attribute does not exclude the possibility that the attribute may contain the attribute's other possible values.

Various operations may be performed on a database or any portion thereof in accordance with a user's objective. The type of data, e.g. exclusive value or non-exclusive value, may be a factor in the handling of the data. The number of values, which is associated with a particular attribute, may be a factor in the handling of data.

For example, with respect to online shopping, input data (e.g., an attribute of a customer) is often related to target outcome data (e.g., a target product) in determining the likelihood that a particular outcome will be achieved (e.g., the likelihood that a customer will purchase the target product). The input data, the target outcome data, and the relationship between the input and target outcome data provide correlation data, which is often used by systems in generating predictions and business information. Consequently, this information needs to be configured in a manner that allows a prediction system the ability to handle it in a manner consistent with predetermined algorithms and operations.

FIG. 2 is a block diagram illustrating an array attribute configurator 16, which establishes an array attribute as a basis for providing reliable information in accordance with one embodiment. An array attribute corresponds to an array of values that are associated with a particular attribute. Array attribute has a predetermined set of values $x_1$ to $x_n$ that are associated with the attribute. A value field $F_i$ denotes an area of the array attribute that corresponds to a particular value $x_i$. The size of the array attribute is predetermined, and is based upon the number of unique value fields. The size of the array attribute, generally, corresponds to the maximum number of unique value fields that may be associated with the particular attribute.

Array attribute configurator 16 may receive any number of values, which are associated with a particular attribute. The values, which are received by array attribute configurator 16, may be non-exclusive values. The number of values that array attribute configurator 16 may receive is independent of the number of unique value fields that are associated with the array attribute. In other words, the number of received values may be less than, equal to, or greater than the number of unique value fields associated with the array attribute.

For example, an array attribute configurator may be set up to establish an array attribute for the attribute, "mobile phone accessories purchased." In this case, each unique value field represents a particular mobile phone accessory. The unique value field set represents all of the mobile phone accessories that are available to be purchased. As a simplified example, the array attribute may include the following unique value fields: mobile phone case, mobile phone charm/ornament, USB cable, mobile phone battery charger, ringtone, headset device, and car charger. In this case, the size of the array attribute is seven. With respect to this attribute, a particular customer's data record may include the following values: ringtone, car charger, mobile phone charm, ringtone, mobile phone ornament, ringtone. Upon receiving these values, the array attribute configurator will form the following array attribute: 0_mobile phone case, 2_mobile phone charm/ornament, 0_USB cable, 0_mobile phone battery charger, 3_ringtone, 0_headset device, and 1_car charger. In this example, "0_headset device" indicates that the customer has purchased zero headset devices. Meanwhile, "3_ringtone" indicates that the customer purchased three ringtones. Although this example represents each element of the array attribute by the following notation, "total $x_{i_{13}}$ value $x_i$," it is recognized that the array attribute is not limited to this notation. The data within each element (or entry) in the array attribute may be represented in any manner that permits another entity to extract the total and the value therefrom, as indicated in FIG. 2

As illustrated in this example, array attribute configurator 16 accounted for duplicate values (e.g., ringtones) and accounted for null values (e.g., mobile phone case). The null values were assigned to the unique value fields that did not have any corresponding values within the set of received values. Array attribute configurator was also able to consolidate values that are considered to belong to the same unique value field (e.g., consolidated the charm and the ornament for the unique value field of "mobile phone charm/ornament"). Once array attribute configurator 16 configures the array attribute, array attribute configurator 16 permits the configured array attribute to be utilized in a functional module, such as a prediction system.

Array attribute configurator 16 may be any software module and/or hardware component. In the exemplary embodiment, array attribute configurator 16 handles input, and interacts with a functional module 18, such as a prediction system that performs predictive analytics. Prediction system handles array attributes in rendering predictions and/or business decisions.

As shown in FIG. 2, array attribute configurator 16 configures and handles the array attribute. The array attribute configurator 16 may store the array attribute, or may allocate storage for the array attribute in a computer readable media. Alternatively, the configuring, storing, and handling of the array attribute may occur independently of system 10. In this alternative case, the results obtained from the configuring and handling of the array attribute may be introduced into system 10 or into a functional module 18, such as a prediction system.

Figure 3:
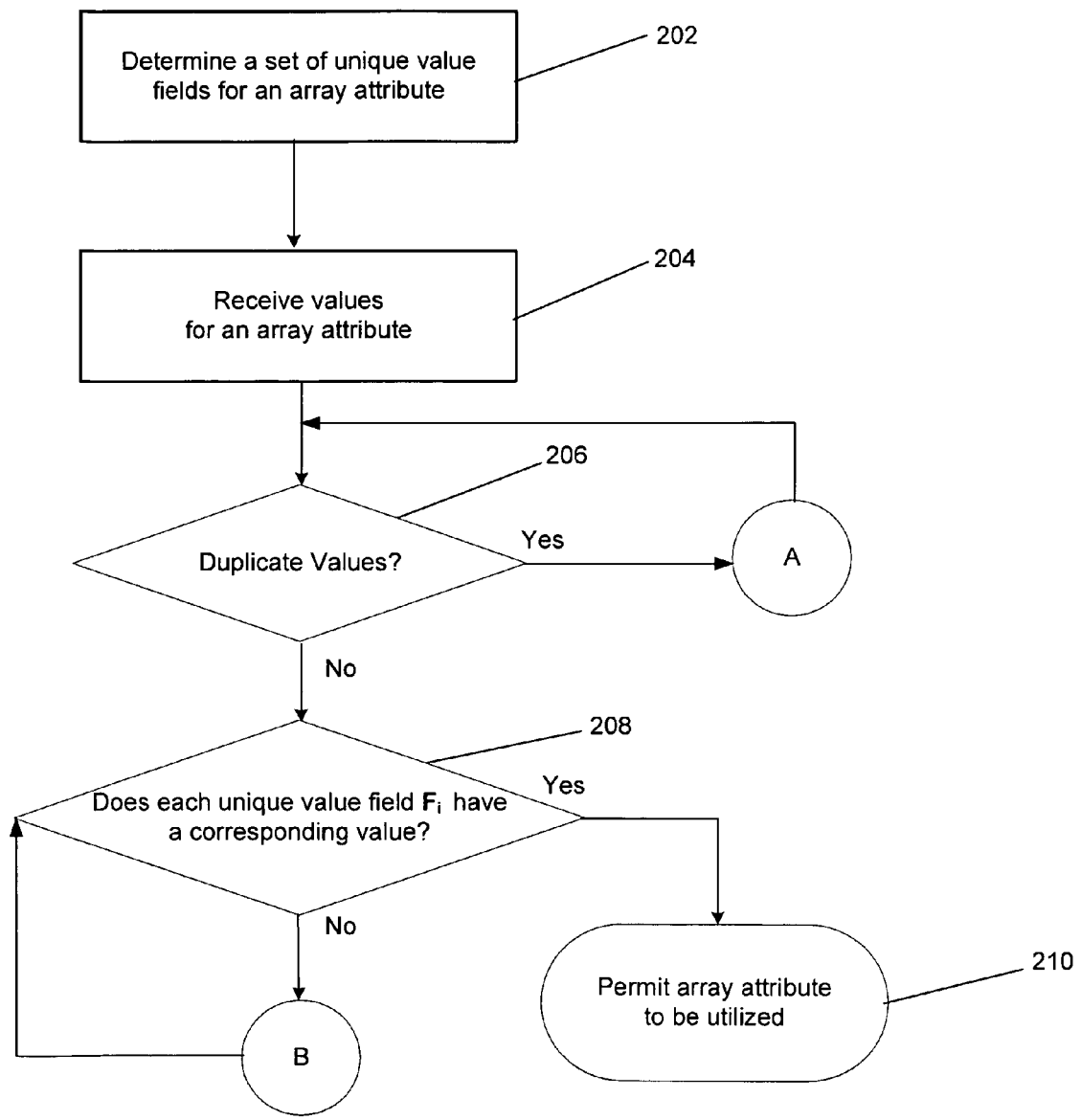
FIG. 3 is a flow diagram illustrating a method of configuring an array attribute in accordance with one embodiment.
Figure 4:
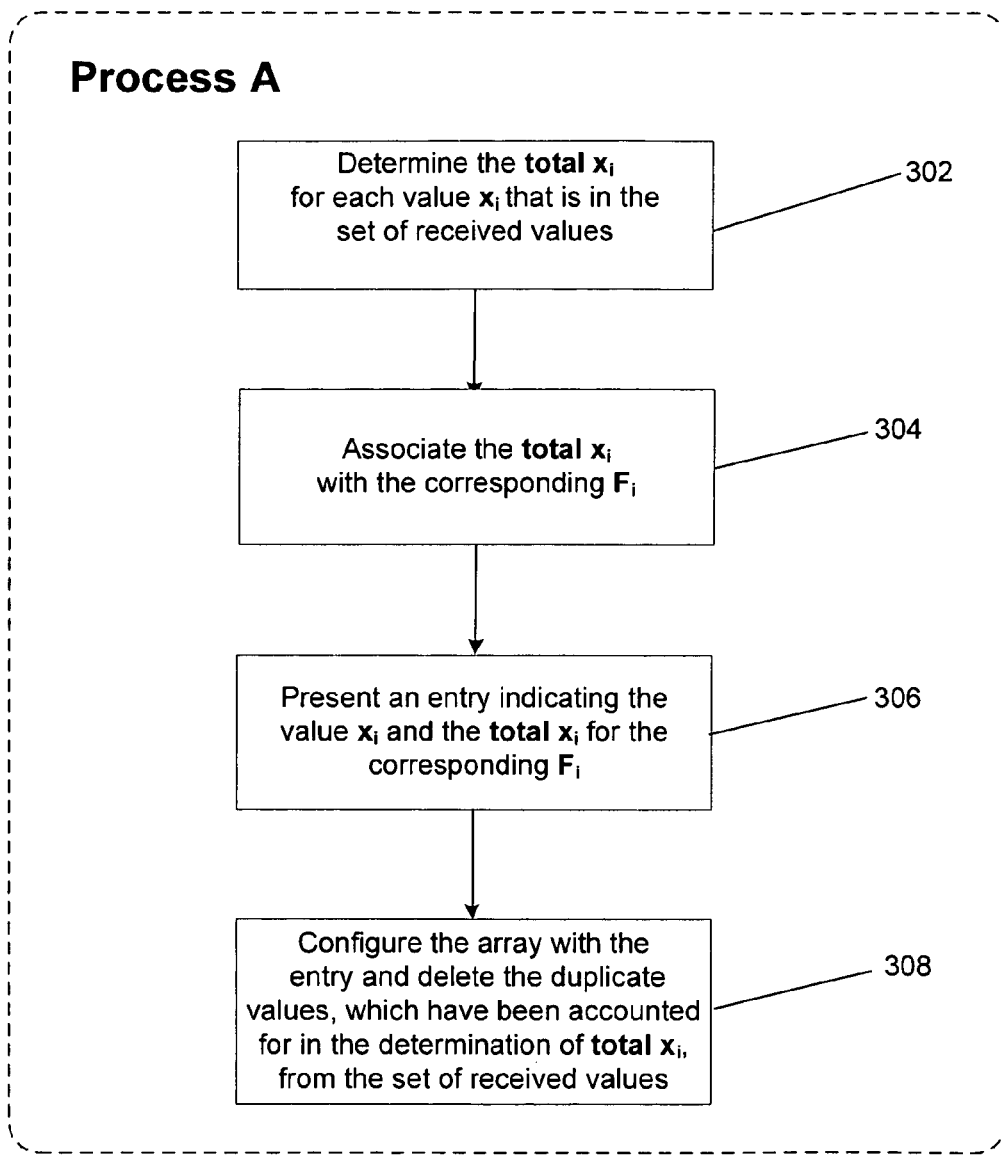
FIG. 4 is a flow diagram illustrating a process that is implemented to consolidate duplicate values in accordance with one embodiment.

FIG. 3 is a flow diagram illustrating a method of configuring an array attribute for a system in accordance with one embodiment. In one embodiment, the functionality of the flow diagram of FIG. 3, and FIGS. 4-6 below, is implemented by software stored in memory or other computer readable or tangible medium, and executed by a processor. In other embodiments, the functionality can be performed by hardware (e.g., through the use of an application specific integrated circuit ("ASIC"), a programmable gate array ("PGA"), a field programmable gate array ("FGPA"), etc.), or any combination of hardware and software.

At 202, the functionality includes determining a set of unique value fields for an array attribute. The unique value fields represent the unique values that the attribute may contain. For example, the attribute, "pets," may include the following unique value fields: fish, cats, dogs, and birds.

At 204, array attribute configurator 16 receives values, associated with a particular attribute, that is to be evaluated. The received values are configured, if deemed necessary, to account for duplicate values and null values. The values may be an integral part of system 10. Additionally or alternatively, the values may be input into system after being retrieved from an external source. In this case, the array attribute includes non-exclusive values for a particular attribute.

At 206, array attribute configurator may determine if any duplicate values from the set of received values exist. The term, "duplicate values," as used herein, may refer to values that are the same, substantially the same, or that may be considered to belong to the same value field or entity. If it is determined that duplicates exist, then the functionality proceeds to Process A of FIG. 4, as indicated in FIG. 3.

Process A is a method of consolidating values with respect to a set of received values that contain values that are considered to be duplicates. Upon detecting duplicates of a particular value within the set of received values, the functionality includes determining the total number of received values, "total $x_i$," that are the same, substantially the same, or are considered to belong to the same value field or entity (302). The process includes associating the calculated total $x_i$ with a corresponding unique value field of the array attribute (304). Once the association has been made, the process presents an entry for the array attribute. The entry indicates the received value and the total number of received values that are associated with the corresponding unique value field $F_i$ of the array attribute (306). Next, the array attribute is configured with the entry. Any received values that have been accounted for in this entry is then deleted (308). Consolidating duplicates in this manner or by any known equivalent manner is advantageous in that the result fully represents the given information in an effective and efficient manner. In addition, the system benefits from eliminating duplicate entries from the set.

If it is determined that no duplicates exist, then the method proceeds to determine if each unique value field has a corresponding value within the set of received values (208).

Figure 5:
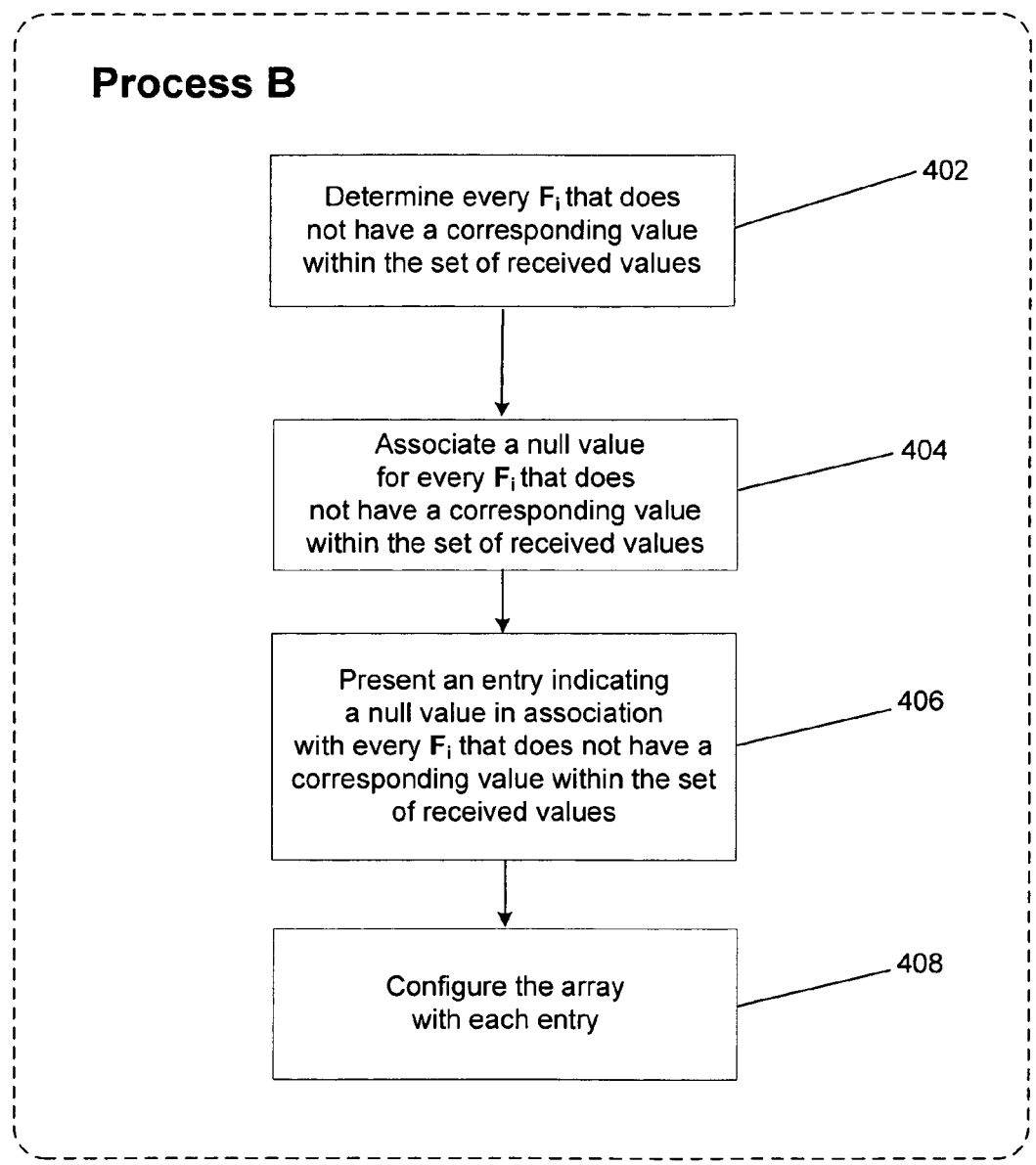
FIG. 5 is a flow diagram illustrating a process that is implemented when at least one unique value field does not have an initial corresponding value in accordance with one embodiment.

At 208, if it is determined that each unique value field does not have a corresponding value, the method proceeds to Process B of FIG. 5, as indicated in FIG. 3.

Process B is a method of indicating if a unique value field does not have a corresponding value within the set of received values. The method derives this information from the set of received values, as explained below.

At 402, the method includes determining every unique value field that does not have a corresponding value within the set of received values. The system associates each of the received values with a unique value field. Each value field represents a predetermined value that may be accepted by the array attribute. The system identifies each unique value field that does not have a corresponding value after each received value is associated with a unique value field.

At 404, the method includes associating a null value for every unique value field that does not have a corresponding value within the set of received values. A null value, when associated with a unique value field, indicates that the system received no values (i.e., a total of zero values) in association with that particular unique value field within the set of received values.

At 406, the method includes presenting an entry for every unique value field that does not have a corresponding value within the set of received values. The entry associates a null value with the selected unique value field, which is not represented by any of the received values.

At 408, the method includes configuring the array with any entry that may have been generated during step 406.

Once it is determined that each unique value field $F_i$ has a corresponding value, then the system has configured the received values in an appropriate array attribute. The system then permits the array attribute to be utilized in a system 100 such as a predictive analytics system, for example, as input data or as target outcome data (210).

Figure 6:
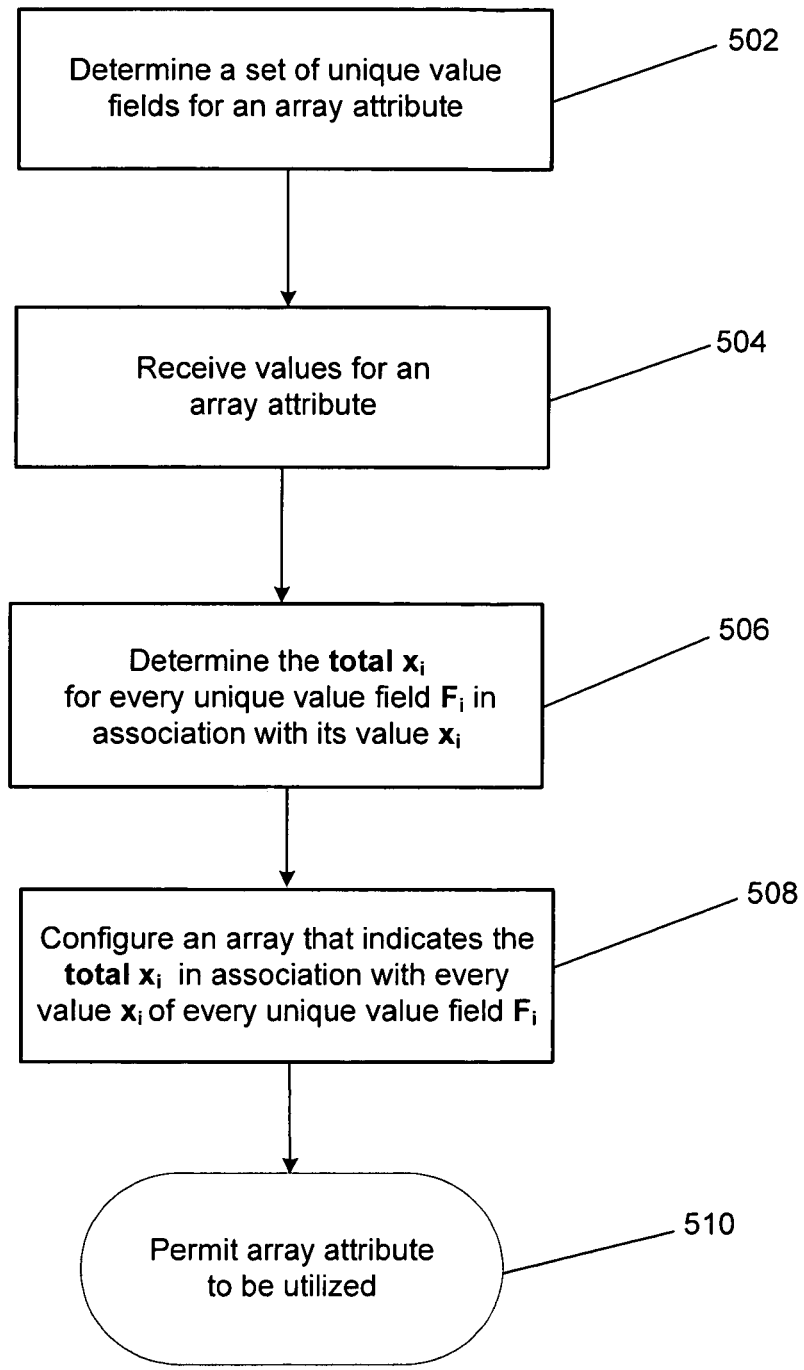
FIG. 6 is a flow diagram illustrating a method of configuring an array attribute in accordance with another embodiment.

FIG. 6 is a flow diagram illustrating a functionality of configuring an array attribute from a set of values in accordance with another embodiment. This embodiment achieves the same objectives of consolidating duplicate values, and accounting for null values.

At 502, array attribute configurator 16 establishes the bounds of the array attribute by determining a set of unique value fields for the array attribute. This determination is similar to the determination made at 202 of FIG. 3.

At 504, array attribute configurator 16 is enabled to receive a set of values for the array attribute.

At 506, array attribute configurator 16 determines the total number of values for each unique value field. This may be performed a number of different ways in different embodiments. For example, when determining the total number of received values that correspond to the unique value field $F_i$, the array attribute configurator 16 may iterate through the set of received values and update a counter whenever it encounters a value $x_i$ or a value that may be considered to belong to the unique value field $F_i$. The array attribute configurator 16 calculates and stores the total number of received values for every single unique value field of the array attribute. If the total number of received values associated with value $x_i$ is zero, then the total for that unique value field is zero.

At 508, array attribute configurator 16 configures the array based on the total $x_i$ in association with every value $x_i$ of every unique value field $F_i$. Array attribute configurator 16 may configure each entry of the array attribute upon determining each total. Alternatively, array attribute configurator 16 may determine the totals of all of the unique value fields at one step, and then configure the array entries with these determined totals in a subsequent step.

After the array attribute is configured, then array attribute configurator 16 permits the array attribute to be utilized in a functional module 18, such as a prediction system (510). As an example, the array attribute may be used as input data or as target outcome data.

Array attribute configurator 16, as disclosed herein, is particularly beneficial for systems that need to derive or extract information based upon an attribute with a number of non-exclusive values.

Array attribute configurator 16 takes a number of received values and configures them into a fixed size array attribute. In many instances, handling data of predetermined sizes is easier than handling data of variable sizes. Manipulating data of a predetermined size is generally easier than manipulating data, which may vary in size.

Further, array attribute configurator 16 is able to take a number of received values, and represent them in a manner that indicates if the set of received values contains "duplicates" and if the set of received values did not have any of the other values that may be associated with that particular attribute. In other words, when accessed, the resulting array attribute immediately provides additional detail and information regarding the set of received values with respect to a particular attribute.

Additionally, array attribute configurator 16 is able to construct an array attribute, which is dynamically data driven and provides flexibility. Instead of creating an attribute for each value (e.g. product/item) at design time, the array attribute configurator 16 generates an array attribute, which allows for a single attribute with data driven values to be created at run time. Array attribute configurator 16 configures the values so that the information is fully expressed as if the set of values were represented by multiple attributes, while also providing the flexibility of data-driven dynamic values at the same time.

Several embodiments are specifically illustrated and/or described herein. However, it will be appreciated that modifications and variations of the disclosed embodiments are covered by the above teachings and within the purview of the appended claims without departing from the spirit and intended scope of the invention. For example, a computer readable medium may include electronic signals.

What is claimed is:

1. A method of configuring an array attribute comprising:
   determining a set of unique value fields for the array attribute, wherein the array attribute is an attribute configured to have multiple values at the same time, wherein the array attribute comprises a one-dimensional array with a same size as the set of unique value fields, wherein data within each field in the array attribute is represented in a format that allows extraction of a total and a value therefrom;
   receiving a set of non-exclusive values for the array attribute;
   determining if any values in the set of non-exclusive values are duplicates corresponding to a same field in the array attribute;
   determining if each field in the array attribute has a corresponding value within the set of non-exclusive values;
   representing duplicates of a particular value in the set of non-exclusive values with a consolidated value in a corresponding field in the array attribute, wherein the consolidated value represents both the particular value and a total number of the particular value in the set of non-exclusive values; and
   adding a null value in each field of the array attribute that has no corresponding value in the set of non-exclusive values.

2. The method of claim 1, further comprising:
   using the array attribute to arrive at a prediction upon completing the representing and the adding.

3. The method of claim 1, wherein the set of non-exclusive values are associated with a single attribute.

4. The method of claim 1, wherein the consolidated value is represented by a notation comprising: "total number of the particular value_particular value".

5. The method of claim 1, wherein the set of unique value fields has a pre-determined fixed size.

6. The method of claim 1, wherein the set of non-exclusive values comprises data driven dynamic values received at run time, wherein the array attribute is created at run time based on the data driven dynamic values.

7. A non-transitory computer readable medium having instructions stored thereon that, when executed by a processor, cause the processor to:
   determine a set of unique value fields for the array attribute, wherein the array attribute is an attribute configured to have multiple values at the same time, wherein the array attribute comprises a one-dimensional array with a same size as the set of unique value fields, wherein data within each field in the array attribute is represented in a format that allows extraction of a total and a value therefrom;
   receive a set of non-exclusive values for the array attribute;
   determine if any values in the set of non-exclusive values are duplicates corresponding to a same field in the array attribute;
   determine if each field in the array attribute has a corresponding value within the set of non-exclusive values;
   represent duplicates of a particular value in the set of non-exclusive values with a consolidated value in a corresponding field in the array attribute, wherein the consolidated value represents both the particular value and a total number of the particular value in the set of non-exclusive values; and
   add a null value in each field of the array attribute that has no corresponding value in the set of non-exclusive values.

8. The non-transitory computer readable medium of claim 7, wherein the set of non-exclusive values are associated with a single attribute.

9. The non-transitory computer readable medium of claim 7, wherein the instructions, when executed by the processor, further cause the processor to use the array attribute to arrive at a prediction upon completing the representing and the adding.

10. The non-transitory computer readable medium of claim 7, wherein the consolidated value is represented by a notation comprising: "total number of the particular value_particular value".

11. The non-transitory computer readable medium of claim 7, wherein the set of unique value fields has a pre-determined fixed size.

12. The non-transitory computer readable medium of claim 7, wherein the set of non-exclusive values comprises data driven dynamic values received at run time, wherein the array attribute is created at run time based on the data driven dynamic values.

13. A system comprising:
   a memory configured to store an array attribute configurator module; and
   a processor configured to execute the array attribute configurator module stored on the memory to:
      determine a set of unique value fields for the array attribute, wherein the array attribute is an attribute configured to have multiple values at the same time, wherein the array attribute comprises a one-dimensional array with a same size as the set of unique value fields, wherein data within each field in the array attribute is represented in a format that allows extraction of a total and a value therefrom;
      receive a set of non-exclusive values for the array attribute;
      determine if any values in the set of non-exclusive values are duplicates corresponding to a same field in the array attribute;
      determine if each field in the array attribute has a corresponding value within the set of non-exclusive values;
      represent duplicates of a particular value in the non-exclusive values with a consolidated value in a corresponding field in the array attribute, wherein the consolidated value represents both the particular value and a total number of the particular value in the set of non-exclusive values; and
      add a null value in each field of the array attribute that has no corresponding value in the set of non-exclusive values.

14. The system of claim 13, wherein the processor is further configured to execute the array attribute configurator module to use the array attribute to arrive at a prediction upon completing the representing and the adding.

15. The system of claim 13, wherein the set of non-exclusive values are associated with a single attribute.

16. The system of claim 13, wherein the consolidated value is represented by a notation comprising: "total number of the particular value_particular value".

17. The system of claim 13, wherein the set of unique value fields has a pre-determined fixed size.

18. The system of claim 13, wherein the set of non-exclusive values comprises data driven dynamic values received at run time, wherein the array attribute is created at run time based on the data driven dynamic values.

\* \* \* \* \*